April 12, 1927.

J. F. WAGNER 1,624,084

LAND ROLLER AND PULVERIZER

Filed May 25, 1925

INVENTOR.
Joseph F. Wagner.
BY
ATTORNEY.

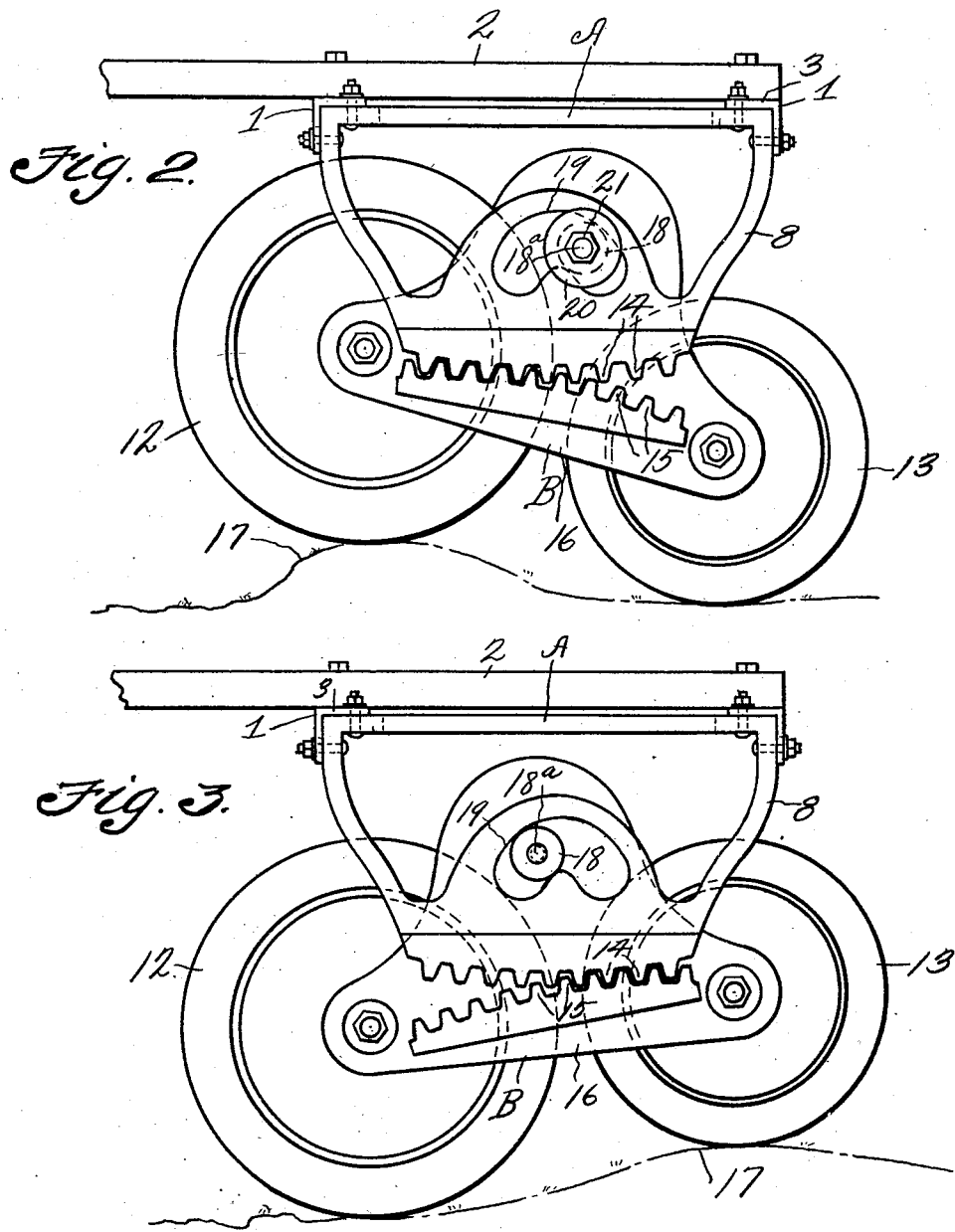

Patented Apr. 12, 1927.

1,624,084

UNITED STATES PATENT OFFICE.

JOSEPH F. WAGNER, OF SOUTH BEND, INDIANA.

LAND ROLLER AND PULVERIZER.

Application filed May 25, 1925. Serial No. 32,850.

The invention relates to land rollers and pulverizers, and has for its object to provide a device of this character wherein a roller carrying frame is rockably connected to a weight frame whereby the weight will be shifted from one roller to the other as the machine moves over rough ground, thereby insuring a uniform application of weight on the rollers as the roller carrying frame rocks incident to the machine passing over uneven ground, for instance as clods of dirt. The shifting action of the weight from one roller to the other causes the rollers to impart a double rolling action on the ground.

A further object is to provide the weight carrying frame and the roller frame with meshing arcuately rockable engaged gear connections which form the draft connections between the frames as well as the rocking connections, and to provide a guide lug connection between the roller carrying frame and the weight frame for maintaining the gear connections in mesh during the rocking of the frames in relation to each other. The lug connection extends through a guide opening or slot in the weight carrying frame, and moves in said slot during the rocking of the frames in relation to each other.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 2 is a side elevation of the land roller showing the weight shifted to the forward roller.

Figure 3 is a side elevation of the land roller showing the weight shifted to the rear roller.

Figure 1:
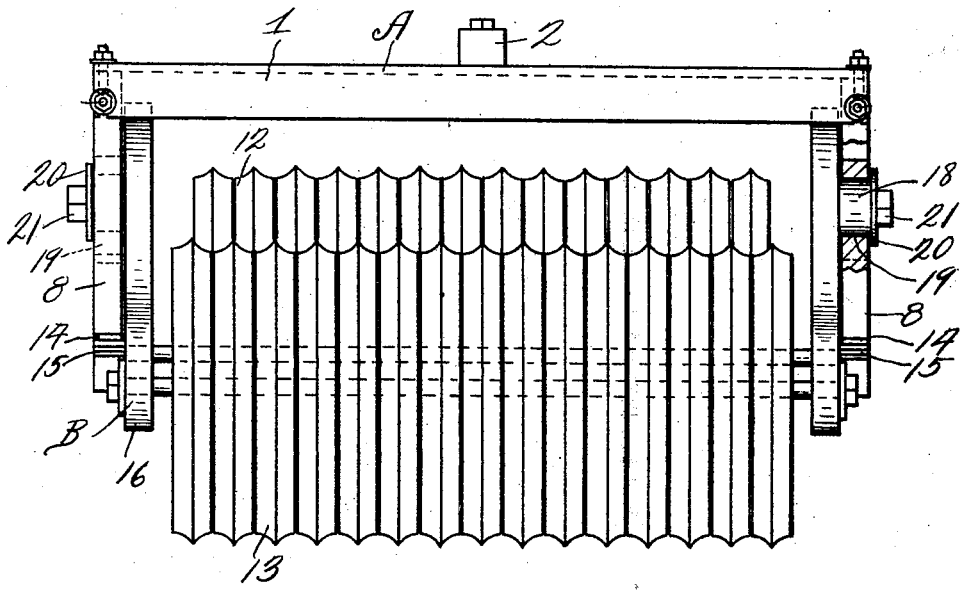
Figure 1 is a rear elevation of the land roller, showing one of the brackets partially broken away to better show the structure.

Referring to the drawings the letter A designates the weight carrying frame and B the roller carrying frame. The weight carrying frame A comprises transversely disposed parallel angle bars 1, which angle bars are connected together substantially centrally thereof by means of a tongue 2, to which draft animals may be attached or the tongue may be attached to a tractor if desired.

The ends of the weight carrying frame are provided with brackets 8 which extend downwardly in parallel relation to each other and have their lower end provided with a plurality of arcuately disposed teeth 14, which teeth mesh with a plurality of arcuately disposed teeth 15 carried by the roller frame plates 16 adjacent the ends of the rollers 12. Plates 16 are interposed between the brackets 8 and the ends of the rollers 12 and 13, and it will be seen that when the roller 12 moves upwardly as shown in Figure 2, when going over a hump 17, the arcuately arranged teeth 14 and 15 will rockably move in mesh thereby shifting the weight of the weight carrying frame A to a point adjacent the axis of the roller 12 as shown in Figure 2, and when the roller 13 moves over the hump 17, the weight of the weight carrying frame will be shifted to a point adjacent the axis of the roller 13, thereby imparting another maximum weight rolling action on the hump. It will be noted that the draft connection between the weight carrying frame and the roller carrying frame is entirely through the meshing rockably engaged arcuately arranged teeth 14 and 15, thereby insuring not only a rockable engagement but a positive draft connection between the two frames. To positively maintain the teeth 14 and 15 in mesh at all times during a rocking action, the end plates 16 of the roller carrying frame B are provided with lugs 18 which extend through guide slots 19 in the end brackets 8, and it will be seen that said lugs 18 will cooperate with the slots, and will prevent the teeth 14 and 15 from coming out of mesh during the rocking action. Lugs 18 are provided with reduced ends 18$^a$ on which washers 20 are disposed and which washers engage the outer sides of the brackets 8 and assist in holding the plates in their rocking operations. Reduced portions 18$^a$ are provided with nuts 21, which engage the washers and hold the washers in position.

From the above it will be seen that a land roller is provided which is simple in construction and one wherein the draft connection between the weight frame and the roller carrying frame is formed by meshing arcuately arranged gear teeth, thereby insuring a positive draft connection between the frames. It will also be seen that means is provided connecting the frames whereby the gear teeth connections will be maintained in mesh at all times during a rocking operation, consequently a positive draft connection of a toothed type is provided adjacent the plane of the axes of the rollers.

The invention having been set forth what is claimed as new and useful is:—

1. The combination with a land roller comprising a weight frame, a roller carrying frame, of arcuately arranged meshing toothed connections between said frames and forming sole draft connections between the frames.

2. The combination with a land roller comprising a weight frame, roller carrying frames, of arcuately arranged meshing rockably engaged toothed connections between the weight carrying frame and the roller carrying frames, said toothed connections forming sole draft connections between all of the frames.

3. The combination with a land roller comprising a weight frame, roller carrying frames, of rockably engaged arcuately arranged toothed connections between all of the frames and lug and slot guide connections between the frames and forming means whereby the toothed connections will be maintained in mesh during their rocking operations.

4. The combination with a land roller comprising a weight frame, roller carrying frames, of arcuately arranged meshing rockably engaged toothed connections between the roller carrying frames and the weight frame and forming draft connections between the frames and means for maintaining said toothed connections during the rocking operation.

5. A land roller comprising a weight frame, a roller carrying frame having spaced rollers, arcuately arranged teeth carried by the weight frame, arcuately arranged teeth carried by the roller frame and meshing with the first mentioned teeth, said arcuately arranged teeth of both frames forming sole draft connections between the frames during the rocking movement of the frames between the axes of the rollers.

6. A land roller comprising a weight frame, a roller carrying frame, rockable gear connections between said frames and forming sole draft connections between the frames.

7. A land roller comprising a weight frame, a roller carrying frame, rockably gear tooth connections between the frames and forming sole draft connections between the frames and lug and slot connections between the frames and forming means whereby the toothed draft connections will be maintained during the rocking of the frames in relation to each other.

In testimony whereof I affix my signature.

JOSEPH F. WAGNER.